Figure 1:
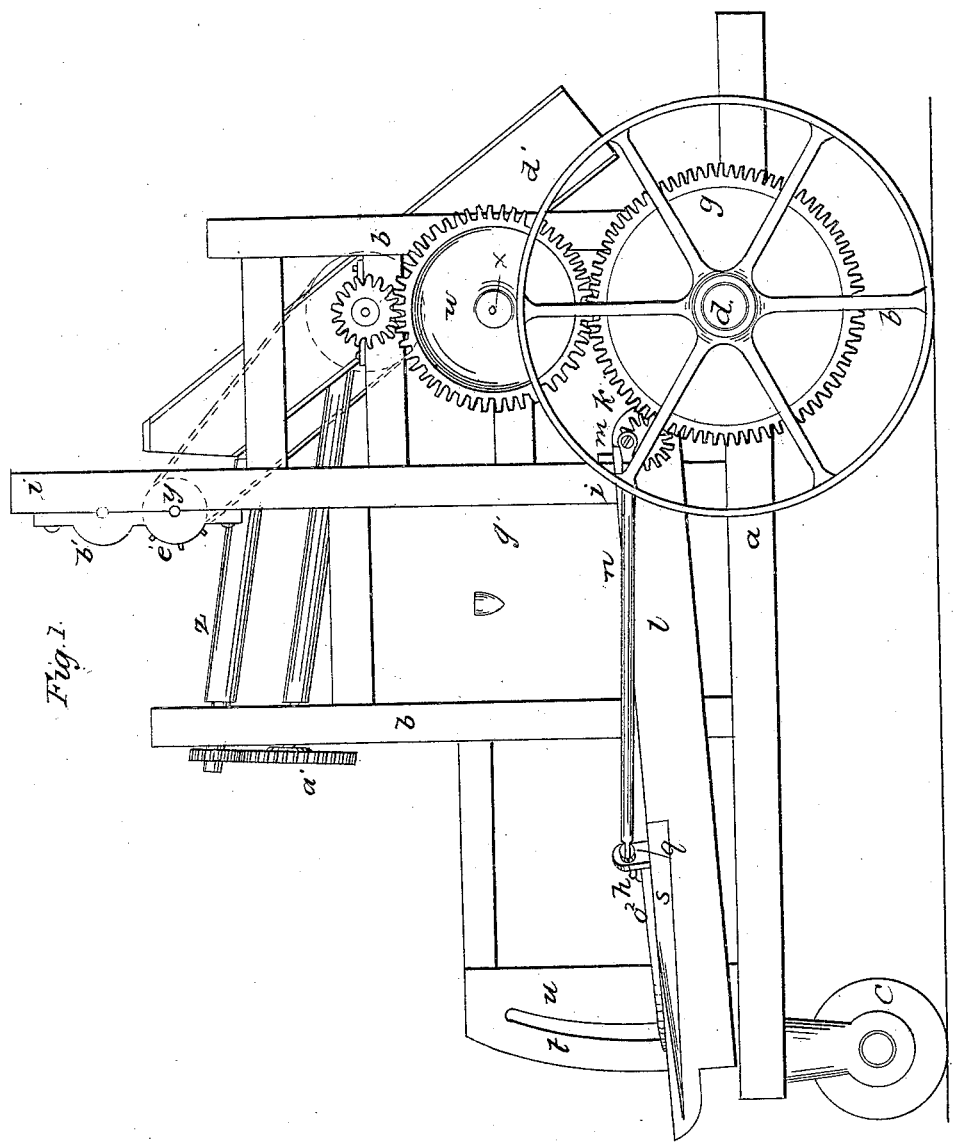

D. A. DICKINSON.
Machine for Harvesting, Husking, and Shelling Corn.

No. 58,785.

2 Sheets—Sheet 1.

Patented Oct. 16, 1866.

WITNESSES
J. Smith
L. Jones

INVENTOR
D. A. Dickinson
by Atty J. P. Everett

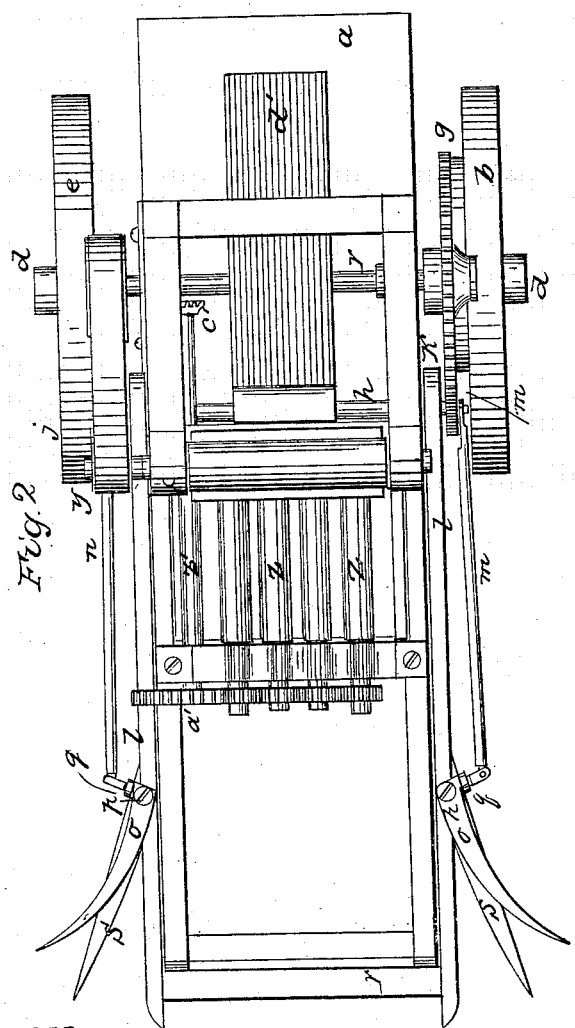

UNITED STATES PATENT OFFICE.

D. A. DICKINSON, OF BALTIMORE, MARYLAND.

IMPROVEMENT IN MACHINES FOR HARVESTING, HUSKING, AND SHELLING CORN.

Specification forming part of Letters Patent No. 58,785, dated October 16, 1866.

*To all whom it may concern:*

Be it known that I, D. A. DICKINSON, of the city of Baltimore, in the State of Maryland, have invented a certain new and useful Improvement in Machines for Cutting, Husking, and Shelling Corn; and I do hereby declare that the following is a full, clear, and exact description of the construction and operation of the same, reference being had to the accompanying drawings, and to the letters and marks thereon.

My improvement is designed to be used in the field, and is so constructed and operated that it may be drawn or shoved along between the rows or hills of the corn, cutting the stalk below the line of the ears of corn, separating the ear from the stalk, husking or shucking the ear, and shelling the grain from the ear. Suitable places or spaces on the machine are provided for the workmen to stand, to seize and handle the stalks and corn and to give such attention to manipulating the materials operated upon as may be necessary.

The drawings forming part of this specification represent a machine constructed under my invention, Figure 1 thereof being a side view, or a view in elevation, and Fig. 2 being a top view, or a view had by looking down on the machine.

In both of these figures like parts are indicated by like marks and letters.

To a suitable bottom or platform, $a$, are attached the several parts $b\ b$ of the frame-work that support and give bearings to the several and various parts of the machine. Under the front part of the platform is a supporting and guiding wheel, $c$. Upon the platform near the rear end is the axle $d$, on which run the wheels $e$ and $f$, both of which wheels are running wheels, while wheel $f$ only is the driving or power wheel. Affixed to the hub of the wheel $f$ is a toothed disk, $g$, that travels with the rotation of the wheel $f$, and, by its teeth gearing into the teeth of other wheels and pinions, gives motion to several parts of the machine.

A shaft, $h$, having bearings on the uprights $i$, has upon one of its ends a crank-disk, $j$, and on its other end a crank-pinion, $k$. This shaft is rotated by the teeth of the disk $g$ fitting into the teeth of the pinion $k$. This shaft also acts as a fulcrum to the arms $l$ of the frame of the stalk-cutters. The pinion $k$ and disk $j$ have crank-pins $m$, to which are attached the connecting-rods $n$, which rods operate the cutters $o$. It will be noticed that the head $p$ of these cutters has an upright piece, $q$, for the attachment thereto of the end of the connecting-rod, and is so pivoted or screwed to the arm $l$ as to allow the cutters to be vibrated. The arms $l\ l$ are connected in front by a cross-bar, $r$, and have inclined arms $s\ s$ extending outward, so that the corn-stalks come between the arms $s$ and arms $l$ when acted upon by the cutters. The cutters and the frame to which they are attached may be raised or lowered, and thus adjusted to the elevation desired for cutting off the stalks, binding or set screws being affixed to the bars or arms $l$ that may traverse in the slots $t$ of the vertical bars $u$. These cutters may be operated by any other suitable means than those here shown or described, and they and the frame to which they are attached and the means for operating them may be arranged so as to have the adjustability, or raising and lowering, at some other point than that here shown.

From the disk $g$ of the power-wheel motion is conveyed to the shaft $v$ of the sheller by the intervening toothed wheel $w$ on the axle or shaft $x$, and then to the shaft $y$ by a band passing from a pulley on that shaft to a pulley on the shaft $v$ of the sheller.

The husking or shucking rollers $z\ z\ z\ z$ are operated by the toothed wheel $a'$ on the end of the shaft $b'$, the teeth of the wheel $a'$ fitting into the teeth of the pinion of the husking-roller next to it, and the other rollers rotated by the pinions on the end of each roller, respectively, so that the surfaces of the first and second rollers move toward each other, as do also the surfaces of the third and fourth rollers.

The shaft $b'$ has its motion from a pinion, $c'$, on its inner end gearing into a pinion on the shaft $v$ of the sheller.

The sheller is of the kind generally used in tubes or boxes constructed like the one here shown, $d'$. In this tube or box two are contained, but, as is evident, only one may be used in small machines, and more than two in some large machines; and any sheller that can be arranged in a tube or box can be used in connection with the other parts of this machine.

Upon the shaft $y$ are long cutters $e'$ for cutting off the stalk from the ear, at or near the large end thereof, the stalk being fed in between the cutters and the roller or cylinder $f'$. This cylinder $f'$ has its bearings in the uprights $i$, and is moved by friction only.

When the stalk is cut off from the ear, the ear drops into and between the rollers $z$, where it is husked or shucked, the ear then passing down in the box to the sheller, and the husks dropping down into the chamber underneath the rollers, from whence they may be removed through the door $g'$.

The husking-rollers $z$ will be covered with india-rubber or gutta-percha, or they may be roughened, so as to operate more effectually in removing the husks from the ears of the corn.

From this description of the construction and operation of this machine, it will readily be seen that the attendant will take the stalks having the ears from the cutters $o$, and place the end of the stalks between the cutters $e'$ and roller $f'$, where the stalk will be cut from the ear, the stalks dropping away from the cutters and roller, and the ear falling onto the roller $z$, where the husk will be removed and the ear then passed on to the sheller, and the operations of the machine there terminating, the grain being delivered upon the rear of the platform or into sacks or some other receptacle that there may be placed.

What I claim as my invention, and desire to secure by Letters Patent, is—

1. A machine for cutting the stalks from the hill or row, separating the stalks from the ears, husking the ear, and shelling it, when the different pieces or parts thereof are constructed, arranged, and operated substantially as herein recited.

2. Combining, with cutting and husking or shelling machines, the arrangement of the means or parts constituting the apparatus for cutting the stalks from the hills or rows, when constructed and operated substantially as set forth.

This specification signed this 28th day of July, 1866.

D. A. DICKINSON.

Witnesses:
    THOS. T. EVERETT,
    T. SMITH.